(12) United States Patent
Yamamoto (10) Patent No.: US 12,072,017 B2
(45) Date of Patent: Aug. 27, 2024

(54) SPEED REDUCER-EQUIPPED MOTOR UNIT

(71) Applicant: MABUCHI MOTOR CO., LTD., Chiba (JP)

(72) Inventor: Kazuyuki Yamamoto, Chiba (JP)

(73) Assignee: MABUCHI MOTOR CO., LTD., Chiba (JP)

( * ) Notice: Subject to any disclaimer, the term of this patent is extended or adjusted under 35 U.S.C. 154(b) by 0 days.

(21) Appl. No.: 18/551,402

(22) PCT Filed: Nov. 22, 2022

(86) PCT No.: PCT/JP2022/043236
§ 371 (c)(1),
(2) Date: Sep. 20, 2023

(87) PCT Pub. No.: WO2024/014011
PCT Pub. Date: Jan. 18, 2024

(65) Prior Publication Data
US 2024/0167560 A1   May 23, 2024

(51) Int. Cl.
*F16H 57/04* (2010.01)
*F16H 19/02* (2006.01)
*E05F 15/603* (2015.01)

(52) U.S. Cl.
CPC ......... *F16H 57/0464* (2013.01); *F16H 19/02* (2013.01); *F16H 57/0498* (2013.01);
(Continued)

(58) Field of Classification Search
CPC .. F16H 57/0464; F16H 19/02; F16H 57/0498; E05Y 2201/71; E05Y 2900/55; E05F 15/603
See application file for complete search history.

(56) References Cited

U.S. PATENT DOCUMENTS

| 6,225,265 B1 | 5/2001 | Shibuya et al. |
| 2008/0242566 A1* | 10/2008 | Lockwood ........... C10M 169/04 508/113 |
| 2019/0241826 A1 | 8/2019 | Sawaguchi et al. |

FOREIGN PATENT DOCUMENTS

| CN | 1236216 A | 11/1999 |
| EP | 0962516 A2 | 12/1999 |

(Continued)

OTHER PUBLICATIONS

International Search Report in PCT Application No. PCT/JP2022/043236, mailed Feb. 21, 2023, 5pp.
(Continued)

*Primary Examiner* — Vishal V Vasisth
(74) *Attorney, Agent, or Firm* — HAUPTMAN HAM, LLP (57) ABSTRACT

A motor unit for transmitting a driving force of a motor driven by a battery to an opening and closing mechanism through a worm gear and a worm wheel includes lubricating grease. The grease includes a solid additive that increases a friction coefficient between the worm gear and the worm wheel as its addition amount increases. The addition amount is not less than a first threshold and is not more than a second threshold. The first threshold is an addition amount for realizing a friction coefficient at which transmission efficiency from the worm wheel to the worm gear becomes 0 [%]. The second threshold is an addition amount for realizing a friction coefficient at which a starting voltage of the motor to move the opening and closing mechanism in an opening direction becomes a minimum guaranteed voltage of the battery after the opening and closing mechanism is restrained fully closed.

4 Claims, 5 Drawing Sheets

(52) U.S. Cl.
CPC ......... *E05F 15/603* (2015.01); *E05Y 2201/71* (2013.01); *E05Y 2900/55* (2013.01)

(56) References Cited

FOREIGN PATENT DOCUMENTS

| | | |
|---|---|---|
| JP | H11332177 A | 11/1999 |
| JP | 2001181668 A | 7/2001 |
| JP | 2003097671 A | 4/2003 |
| JP | 2006177426 A | 7/2006 |
| JP | 2008005602 A | 1/2008 |
| JP | 2009097641 A | 5/2009 |
| JP | 2013031240 A | 2/2013 |
| WO | 2018235292 A1 | 12/2018 |

OTHER PUBLICATIONS

Written Opinion in PCT Application No. PCT/JP2022/043236, mailed Feb. 21, 2023, 6pp.
Office Action in DE Application No. 112022001033.9 dated Apr. 30, 2024, 11pp.

\* cited by examiner

SPEED REDUCER-EQUIPPED MOTOR UNIT

RELATED APPLICATIONS

The present application is a National Phase of International Application Number PCT/JP2022/043236 filed Nov. 22, 2022.

BACKGROUND

Technical Field

The present invention relates to a speed reducer-equipped motor unit that transmits a driving force of a motor to an opening and closing mechanism through a worm gear and a worm wheel.

Background Art

Conventionally, a speed reducer-equipped motor unit applied to an opening and closing mechanism is known to have reverse rotation resistance (a self-lock function). The reverse rotation resistance means an ability of a motor of a speed reducer-equipped motor unit not reverse rotating even when an external force is applied from an output side, that is, a side of the opening and closing mechanism. For example, Patent Literature 1 discloses a speed reducer-equipped motor unit in which a metal worm finished only by rolling and a polyacetal worm wheel are used, and a lead angle between the worm and the worm wheel is set to fall within a predetermined range, thereby securing reverse rotation resistance while suppressing an increase in cost and wear of the worm.

CITATION LIST

Patent Literature

Patent Literature 1: JP-A-2006-177426

DISCLOSURE OF THE INVENTION

Problems to be Solved by the Invention

By the way, a speed reducer-equipped motor unit that is higher in reverse rotation resistance may cause an increase in starting voltage of a motor. For this reason, such a speed reducer-equipped motor unit is required to secure appropriate reverse rotation resistance to an extent that a starting voltage is not excessively increased.

The present invention has been made in view of such a problem, and an object thereof is to provide a speed reducer-equipped motor unit capable to suppressing an excessive increase in starting voltage while securing reverse rotation resistance. Note that the present invention is not limited to achieving this object, and another object of the present invention is to achieve operational effects derived from each configuration described in the embodiments for carrying out the invention described later, since the operational effects cannot be obtained by conventional techniques.

Solutions to the Problems

A speed reducer-equipped motor unit according to the present disclosure can be realized as an aspect or an application example disclosed below, and solves at least a part of the problem described above. Note that (2) to (5) are preferred aspects and are not essential.

(1) A speed reducer-equipped motor unit disclosed herein is a speed reducer-equipped motor unit that includes a motor driven by electric power supplied from a battery, transmits a driving force of the motor to an opening and closing mechanism through a worm gear and a worm wheel, and includes grease that lubricates the worm gear and the worm wheel. The grease includes base oil serving as a base material of the grease, a thickener that is dispersed in the base oil and forms a three-dimensional structure, and a solid additive that is dispersed in the base oil and increases a friction coefficient between the worm gear and the worm wheel as its addition amount increases, the solid additive being added to allow the addition amount to be equal to or more than a first threshold value and equal to or less than a second threshold value. The first threshold value is a value of the addition amount for realizing the friction coefficient at which transmission efficiency from the worm wheel to the worm gear becomes 0 [%], and the second threshold value is a value of the addition amount for realizing the friction coefficient at which a starting voltage of the motor, the starting voltage being required to move the opening and closing mechanism in a direction of opening, becomes a minimum guaranteed voltage of the battery after the opening and closing mechanism is restrained to be fully closed in a specific environment.

(2) In the above case of (1), preferably, the specific environment is an environment in which an output voltage of the battery is higher than a rated voltage of the battery.

(3) In the above case of (1) or (2), preferably, the solid additive is an acrylic resin powder.

(4) In any one of the above cases of (1) to (3), preferably, the minimum guaranteed voltage is a voltage that is 60 [%] of a rated voltage of the battery.

(5) In any one of the above cases of (1) to (4), preferably, the opening and closing mechanism is a power window.

Effects of the Invention

With the speed reducer-equipped motor unit according to the present disclosure, it is possible to suppress an excessive increase in starting voltage while securing reverse rotation resistance.

DESCRIPTION OF PREFERRED EMBODIMENTS

As an embodiment, a speed reducer-equipped motor unit will now be described with reference to the accompanying drawings. The embodiment described below is a mere example, and there is no intention to exclude the application of various modifications and techniques that are not explicitly described in the embodiment described below. Each configuration of the present embodiment can be variously modified and implemented without departing from the spirit thereof. In addition, selection can be made as necessary, or a combination can be made as appropriate.

The speed reducer-equipped motor unit according to the present embodiment is one that transmits a driving force of a motor to an opening and closing mechanism through a worm gear and a worm wheel, and is required to have reverse rotation resistance with which the motor does not reverse rotate even when an external force is applied from an output side, that is, a side of the opening and closing mechanism. The speed reducer-equipped motor unit is provided with grease that lubricates the worm gear and the worm wheel. In addition, to the grease, a solid additive is added that increases a friction coefficient between the worm gear and the worm wheel as its addition amount increases. The speed reducer-equipped motor unit according to the present embodiment is characterized in that an appropriate friction coefficient between the worm gear and the worm wheel is realized by adjusting an addition amount of such a solid additive, and an excessive increase in a starting voltage of the motor is suppressed while securing reverse rotation resistance.

[1. Configuration]

Figure 1:
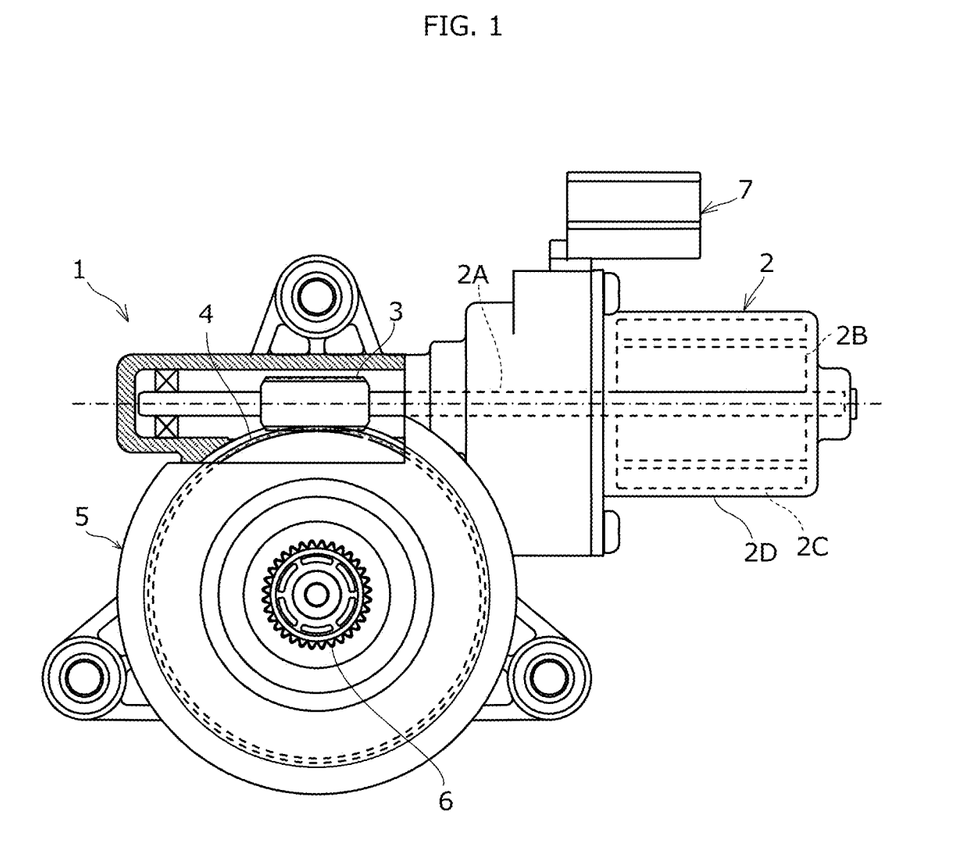
FIG. 1 is a partial cross-sectional view of a speed reducer-equipped motor unit according to an embodiment.

FIG. 1 is a partial cross-sectional view illustrating an appearance and a partial internal structure of the speed reducer-equipped motor unit according to the present embodiment (hereinafter referred to as a "motor unit 1"). As illustrated in FIG. 1, the motor unit 1 includes a motor 2 serving as a drive source, a worm gear 3, and a worm wheel 4. Grease is applied to a sliding portion between the worm gear 3 and the worm wheel 4. As described above, the motor unit 1 transmits a driving force of the motor 2 to a non-illustrated opening and closing mechanism through the worm gear 3 and the worm wheel 4. Examples of the opening and closing mechanism include a power window (a window regulator) of a vehicle.

The motor 2 is a driving device that is driven by electric power supplied from a non-illustrated battery, and is, for example, a brushed direct current (DC) motor. The motor 2 includes a rotor 2B and a stator 2C incorporated in a housing 2D, and a shaft 2A that rotates integrally with the rotor 2B. The motor 2 is integrated with a gear box 5 by coupling the housing 2D to the gear box 5 that accommodates the worm gear 3 and the worm wheel 4. In this state, one end of the shaft 2A is rotatably supported by the housing 2D, and the other end extends from the housing 2D and is disposed inside the gear box 5. In addition, the gear box 5 is provided with a connector portion 7 for coupling to the battery, and the motor 2 is coupled to the battery with a connector of the battery inserted into the connector portion 7.

The worm gear 3 is a gear driven by the motor 2, and is, for example, a screw gear formed of a rolled steel material (for example, low carbon steel). In the present embodiment, the worm gear 3 is fitted and coupled to the shaft 2A of the motor 2. Since the shaft 2A and the worm gear 3 are configured separately in this manner, an outer diameter of the worm gear 3 is not dependent on an outer diameter of the shaft 2A, and the worm gear 3 having a large diameter can be combined in the motor unit 1 even having a small diameter.

The worm wheel 4 is a gear that meshes with the worm gear 3 and transmits a driving force input from the worm gear 3 to the opening and closing mechanism (the power window), and is, for example, a resin gear formed by injection-molding a polyacetal resin (POM). An output gear 6 meshing with a non-illustrated gear provided in the opening and closing mechanism (the power window) is coupled to the worm wheel 4. With such a configuration, a driving force input from the worm gear 3 is transmitted to the opening and closing mechanism (the power window) through the worm wheel 4 and the output gear 6. As a result, a non-illustrated window of the vehicle is opened and closed.

The grease mainly includes base oil serving as a base material, a thickener dispersed in the base oil to form a three-dimensional structure, and a solid additive dispersed in the base oil to increase a friction coefficient $\mu$ between the worm gear 3 and the worm wheel 4 as its addition amount N increases. In the present embodiment, materials described below are used as the base oil, the thickener, and the solid additive of the grease. In addition, in the present embodiment, the grease is adjusted in its consistency to one of Nos. 1 to 3.

Base oil: polyalphaolefin (PAO) oil
Thickener: alicyclic urea
Solid additive: acrylic resin powder (polyacrylic acid ester)

Note that the base oil of the grease is not limited to polyalphaolefin oil, and chemical synthetic oil such as ester oil, ether oil, silicone oil, alkylbenzene oil, or fluorine-based oil may be applied. In addition, not only chemical synthetic oil, but also mineral oil or vegetable oil may be applied.

The thickener of the grease is not limited to alicyclic urea, and a urea-based compound such as aliphatic urea or aromatic urea may be applied. In addition, not only a urea-based compound, but also one kind of soap such as lithium soap, lithium complex soap, calcium soap, calcium complex soap, aluminum soap, aluminum complex soap, sodium soap, or barium soap, a fluororesin, bentonite, silica, or Na terephthalate may be applied. However, the thickener is preferably a urea-based compound because a urea-based compound is compatible with an acrylic resin powder serving as the solid additive, is easily adjusted in a direction of increasing the friction coefficient $\mu$ between the worm gear 3 and the worm wheel 4, and is excellent in high-temperature characteristics.

The solid additive (a solid lubricant) is not limited to polyacrylic acid ester as long as the friction coefficient $\mu$ between the worm gear 3 and the worm wheel 4 is adjustable. As the solid additive, for example, an acrylic resin powder such as polymethacrylic acid ester, sodium polyacrylate, polyacrylonitrile, or polyacrylamide may be applied. In addition, the solid additive is not limited to an acrylic resin powder, and a nylon resin, melamine cyanurate (MCA), polytetrafluoroethylene (PTFE), graphite, graphite fluoride, molybdenum disulfide, antimony sulfide, boron nitride, or alkali (earth) metal borate may be applied, for example. However, the solid additive is preferably an acrylic resin powder since an acrylic resin powder is easily adjusted in a direction of increasing the friction coefficient $\mu$ between the worm gear 3 and the worm wheel 4, is easily available, and is less harmful to the human body. Note that, to the grease, an extreme-pressure agent, an antioxidant, a rust inhibitor, a corrosion inhibitor, and the like may be added as appropriate as long as the performance (function) of the grease is not impaired.

As described above, the motor unit 1 according to the present embodiment is one in which the appropriate friction coefficient $\mu$ between the worm gear 3 and the worm wheel 4 is realized by adjusting the addition amount N of the solid additive, and an excessive increase in a starting voltage V of the motor 2 is suppressed while securing reverse rotation resistance. Specifically, in the motor unit 1, the solid additive is added to the grease to allow the addition amount N of the solid additive (a mass ratio of the solid additive with respect to a total mass of the grease) to fall within a range of a first threshold value NA or more and a second threshold value NB or less, thereby realizing the performance described above. The first threshold value NA is a threshold value related to securing of reverse rotation resistance, and the second threshold value NB is a threshold value related to suppressing of an excessive increase in the starting voltage V of the motor 2.

The first threshold value NA is a value of the addition amount N of the solid additive for realizing the friction coefficient μ at which transmission efficiency from the worm wheel 4 to the worm gear 3 (hereinafter referred to as "reverse rotation efficiency ηrev") becomes 0 [%]. When the reverse rotation efficiency ηrev becomes 0 [%] or less, a reverse rotation motion when a driving force is transmitted from the worm wheel 4 to the worm gear 3 is prevented, guaranteeing reverse rotation resistance.

Note herein that a formula for calculating the efficiency of the motor unit 1 can be expressed by a formula described below, where transmission efficiency (forward rotation efficiency) related to an input from the worm gear 3 to the worm wheel 4 is represented as ηpos, a pressure angle between the worm gear 3 and the worm wheel 4 is represented as α, a lead angle is represented as γ, and a friction coefficient is represented as μ.

$$\eta pos = \frac{\cos\alpha\cos\gamma - \mu\sin\gamma}{\cos\alpha\sin\gamma + \mu\cos\gamma} \cdot \tan\gamma \qquad \text{[Mathematical formula 1]}$$

$$\eta rev = \frac{\cos\alpha\sin\gamma - \mu\cos\gamma}{\cos\alpha\cos\gamma + \mu\sin\gamma} \cdot \frac{1}{\tan\gamma} \qquad \text{[Mathematical formula 2]}$$

Figure 2:
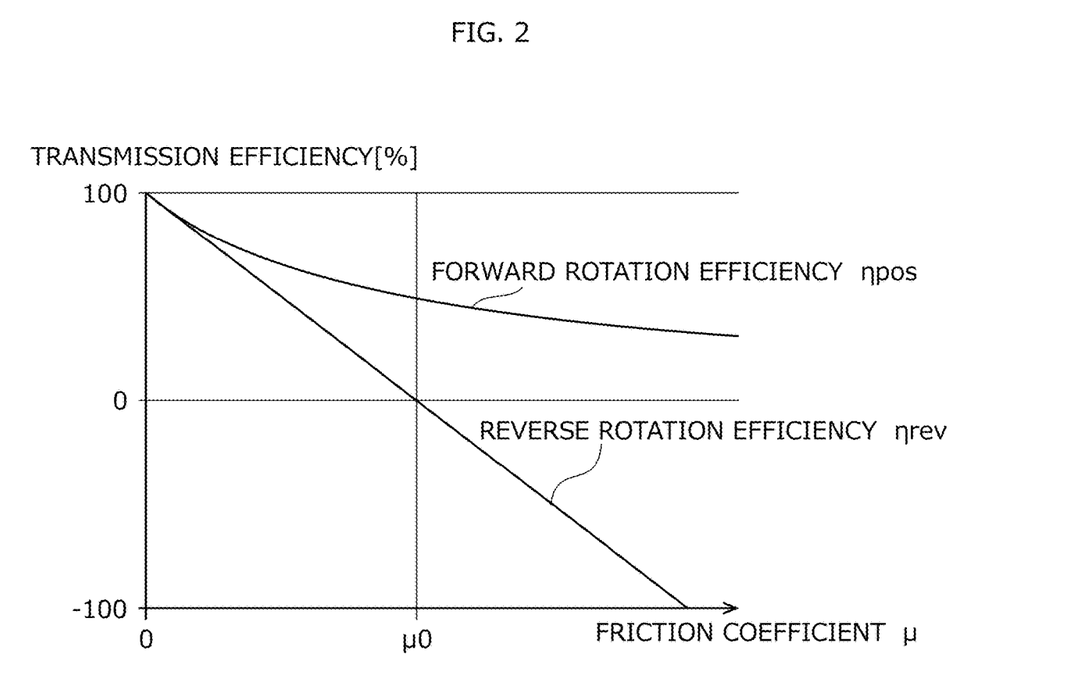
FIG. 2 is a graph illustrating a relationship between transmission efficiency and a friction coefficient in the speed reducer-equipped motor unit illustrated in FIG. 1.

When the pressure angle α and the lead angle γ between the worm gear 3 and the worm wheel 4 are set based on the specifications of the motor, values of the forward rotation efficiency ηpos and the reverse rotation efficiency rev are determined in accordance with the friction coefficient μ, as illustrated in the graph of FIG. 2. In addition, when the formula described above is rearranged, the friction coefficient μ at which the reverse rotation efficiency ηrev from the worm wheel 4 to the worm gear 3 becomes 0 [%] (hereinafter referred to as a "boundary friction coefficient μ0") can be obtained with a formula described below. As illustrated in FIG. 2, the reverse rotation efficiency ηrev decreases as the friction coefficient μ increases, and has a negative value after crossing the boundary friction coefficient μ0, and, as the reverse rotation efficiency ηrev becomes larger than the boundary friction coefficient μ0, high reverse rotation resistance (self-locking) is secured.

$$\mu 0 = \frac{\cos\alpha\sin\gamma}{\cos\gamma} \qquad \text{[Mathematical formula 3]}$$

Figure 3:
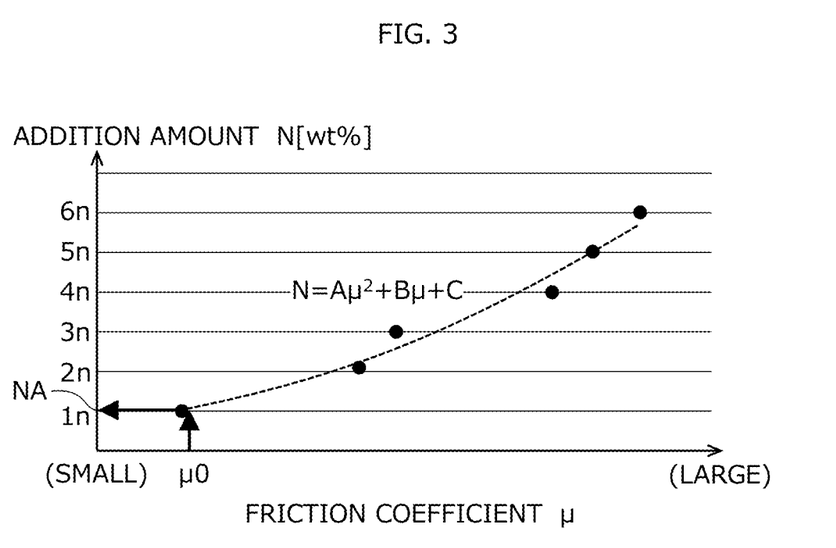
FIG. 3 is a graph illustrating a relationship between an addition amount of a solid additive and a friction coefficient.

The first threshold value NA for realizing the boundary friction coefficient μ0 is set using, for example, an experimentally-obtained relationship between the addition amount N of the solid additive and the friction coefficient μ. FIG. 3 is a plot of experimental values of the friction coefficients μ obtained when a plurality of grease samples where the addition amounts N of the solid additive differ from each other is applied to the motor unit 1. The graph of FIG. 3 plots the experimental values of the friction coefficients μ obtained from six kinds of grease samples where the addition amounts N of the solid additive are 1n, 2n, 3n, 4n, 5n, and 6n [wt %] (n>0 [wt %]). As illustrated in FIG. 3, there is a positive correlation between the addition amount N of the solid additive and the friction coefficient μ, where the friction coefficient μ increases as the addition amount N increases. The first threshold value NA is set using this correlation.

Specifically, an approximate expression (for example, a quadratic function of the friction coefficient μ) is derived from the experimental values of the friction coefficients μ obtained from the samples as indicated by a broken line in FIG. 3. Then, the addition amount N [N=A(μ0)²+B(μ0)+C] of the solid additive for realizing the boundary friction coefficient μ0 is calculated from the derived approximate expression, and this value is set as the first threshold value NA. In this case, 1n [wt %] is set as the first threshold value NA.

The second threshold value NB is a value of the addition amount N of the solid additive for realizing the friction coefficient μ at which the starting voltage V of the motor 2 becomes a minimum guaranteed voltage Vx of the battery. Note herein that the starting voltage V means a voltage required to move the opening and closing mechanism in a direction of opening after the opening and closing mechanism is restrained to be fully closed in a specific environment. Such a voltage is also referred to as a reverse starting voltage. In a case where the opening and closing mechanism is a power window, a voltage required, after a window glass is fully closed in a specific environment and an upper end of the window glass is restrained, to cause the window glass to move in a direction of lowering (a direction of opening the window) as the starting voltage V.

In the present embodiment, the specific environment means an environment in which an output voltage of a battery becomes higher than a rated voltage of the battery, such as an environment in which a non-illustrated alternator turns and the battery is fully charged. When the motor 2 is driven in such a specific environment, a driving force larger than a normal driving force [in a state (an environment) where an output voltage of the battery is equated or substantially equated to the rated voltage of the battery] is transmitted to the opening and closing mechanism (the power window). As a result, the window glass, when fully closed, receives a restraining force that is stronger than a normal restraining force.

In addition, the minimum guaranteed voltage Vx means a minimum voltage at which the opening and closing mechanism is driven even under a condition that the rated voltage of the battery is not applied to the motor 2 when the voltage in the battery drops due to a change in temperature or a deterioration in performance in the battery or when the voltage of the battery drops due to a wiring resistance from the battery to the motor 2. In the present embodiment, the minimum guaranteed voltage Vx is set to a voltage that is 60 [%] of the rated voltage of the battery.

Figure 4:
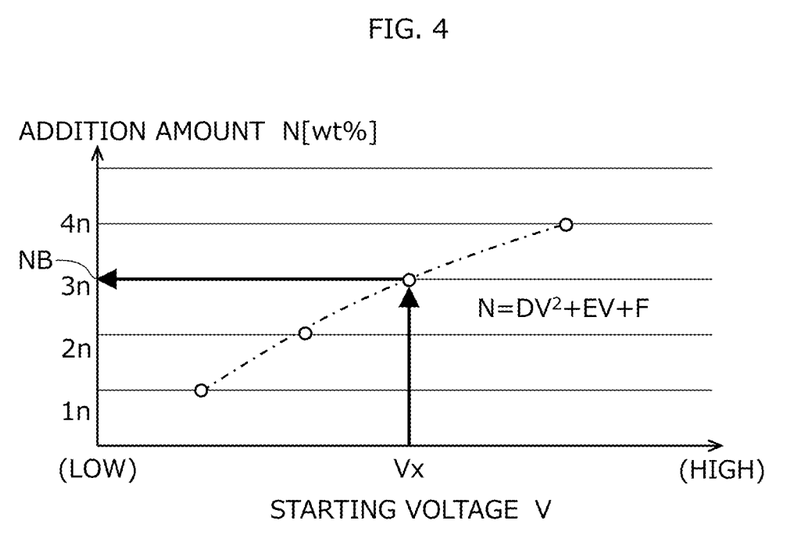
FIG. 4 is a graph illustrating a relationship between the addition amount of the solid additive and a starting voltage.

Similarly to the first threshold value NA, the second threshold value NB is set using, for example, an experimentally-obtained relationship between the addition amount N of the solid additive and the starting voltage V. FIG. 4 is a plot of experimental values of the starting voltages V obtained when a plurality of grease samples where the addition amounts N of the solid additive differ from each other is applied to the motor unit 1. The graph of FIG. 4 plots the experimental values of the starting voltages V obtained from four kinds of grease samples where the addition amounts N of the solid additive are 1n, 2n, 3n, and 4n [wt %] (n>0 [wt %]). As illustrated in FIG. 4, there is a positive correlation between the addition amount N of the solid additive and the starting voltage V where the starting voltage V increases as the addition amount N increases. The second threshold value NB is set using this correlation.

Specifically, an approximate expression (for example, a quadratic function of the starting voltage V) is derived from the experimental values of the starting voltages V obtained from the samples as indicated by a one-dot chain line in FIG. 4. Then, the addition amount N [$N=D(Vx)^2+E(Vx)+F$] of the solid additive for realizing the friction coefficient $\mu$ at which the starting voltage V becomes the minimum guaranteed voltage Vx is calculated from the derived approximate expression, and this value is set as the second threshold value NB. In this case, 3n [wt %] is set as the second threshold value NB.

Figure 5:
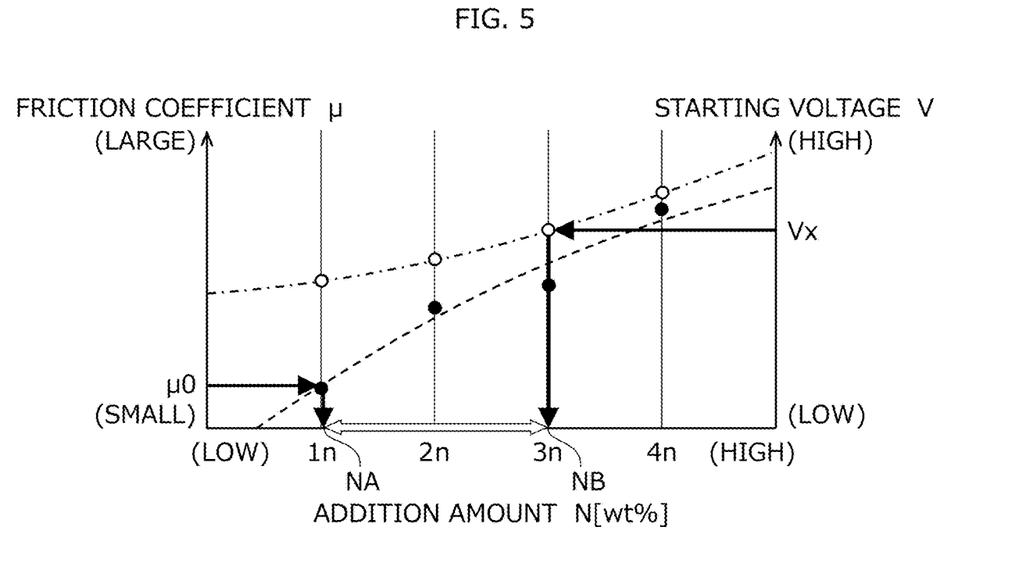
FIG. 5 is a view in which the vertical axis and the horizontal axis of the graphs illustrated in FIGS. 3 and 4 are interchanged to form one graph.

FIG. 5 is a view in which the vertical axis and the horizontal axis of the graphs illustrated in FIGS. 3 and 4 are interchanged to form one graph. As the first threshold value NA and the second threshold value NB are set with the procedures described above, an optimum range of the addition amount N of the solid additive (1n to 3n [wt %]) is determined, as indicated by hollow arrows in FIG. 5. The addition amount N of the solid additive is set to fall within this range. As a result, in the motor unit 1, its reverse rotation resistance is secured, and an excessive increase in the starting voltage V is suppressed.

More specifically, as the addition amount N of the solid additive is adjusted to a value equal to or larger than the first threshold value NA, the friction coefficient $\mu$ has a value equal to or larger than the boundary friction coefficient $\mu 0$, as indicated by a broken line in FIG. 5. As a result, since the reverse rotation efficiency $\eta rev$ becomes 0 [%] or less, reverse rotation resistance is secured for the motor unit 1. In addition, as the addition amount N of the solid additive is adjusted to a value equal to or less than the second threshold value NB, the starting voltage V is suppressed to a value equal to or less than the minimum guaranteed voltage Vx, as indicated by a one-dot chain line in FIG. 5. Therefore, the starting voltage V does not exceed the minimum guaranteed voltage Vx, that is, an excessive increase in the starting voltage V is suppressed, and starting of the motor 2 under various conditions is guaranteed. Note that the addition amount N of the solid additive to be added to the grease may be finally set by experimentally determining a value that also enhances other performances of the grease (for example, the performance of lubricating the worm gear 3 and the worm wheel 4) within the range described above.

[2. Effects]

(1) In the motor unit 1 described above, the addition amount N of the solid additive to be added to the grease is set to fall within the range of the first threshold value NA or more and the second threshold value NB or less. In addition, the first threshold value NA is set to a value for realizing the friction coefficient $\mu$ at which the reverse rotation efficiency $\eta rev$ becomes 0 [%], and the second threshold value NB is set to a value for realizing the friction coefficient $\mu$ at which the starting voltage V of the motor 2 becomes the minimum guaranteed voltage Vx. As a result, the friction coefficient $\mu$ can be appropriately adjusted to a value capable of securing reverse rotation resistance and suppressing an excessive increase in the starting voltage V. Therefore, the motor unit 1 can suppress an excessive increase in the starting voltage V of the motor 2 while securing reverse rotation resistance.

(2) In the motor unit 1 described above, a specific environment related to the definition of the starting voltage V is an environment in which an output voltage of the battery is higher than the rated voltage of the battery. As a result, for example, even when a window glass receives, when fully closed, a restraining force that is stronger than a normal restraining force and is restrained, subsequent starting of the motor 2 can be guaranteed. In particular, for a power window, since movement of a window glass is guaranteed after attaining such a state where its upper end is restrained, the occurrence of such an inconvenience that the window does not open can be suppressed.

(3) In the motor unit 1 described above, since an acrylic resin powder is used as the solid additive, the grease can be easily adjusted in its characteristics in a direction of increasing the friction coefficient $\mu$. Furthermore, since an acrylic resin powder rarely change its nature, is easy to handle, and is easily available, such grease that satisfies the performance described above can be easily produced.

(4) In the motor unit 1 described above, the minimum guaranteed voltage Vx is set to a voltage that is 60 [%] of the rated voltage of the battery. As a result, starting of the motor 2 can be guaranteed even under a condition that the rated voltage of the battery is not applied to the motor 2 when the voltage in the battery drops due to a change in temperature or a deterioration in performance or when the voltage in the battery drops due to a wiring resistance from the battery to the motor 2.

[3. Others]

The configuration of the motor unit 1 illustrated in the embodiment described above is a mere example, and the motor unit 1 is not limited to having such a configuration as described above. The worm gear 3 may not be directly coupled to the shaft 2A of the motor 2 as long as the worm gear 3 is driven by the motor 2. In addition, the output gear 6 may not be directly coupled to the worm wheel 4 as long as the worm wheel 4 meshes with the worm gear 3. The materials of the worm gear 3 and the worm wheel 4 are also not limited to those described above.

The opening and closing mechanism to which the motor unit 1 is applied is not limited to a power window. For example, the motor unit 1 may be one that drives an opening and closing mechanism for a back door and a slide door of a vehicle or the like. The consistency of the grease may be set as appropriate in accordance with an application of an opening and closing mechanism to which the motor unit 1 is applied.

The methods of setting the first threshold value NA and the second threshold value NB are not limited to the methods described above. For example, approximate expressions derived when setting the first threshold value NA and the second threshold value NB may be derived as linear functions or may be derived as polynomial functions that are higher order than quadratic. The first threshold value NA and the second threshold value NB may be set without using approximate expressions.

The invention claimed is:

1. A speed reducer-equipped motor unit that includes a motor driven by electric power supplied from a battery and transmits a driving force of the motor to an opening and closing mechanism through a worm gear and a worm wheel, the speed reducer-equipped motor unit comprising grease that lubricates the worm gear and the worm wheel, the grease including base oil serving as a base material of the grease, a thickener that is dispersed in the base oil and forms a three-dimensional structure, a solid additive that is dispersed in the base oil and increases a friction coefficient between the worm gear and the worm wheel as an addition amount thereof increases, an amount of the addition amount ranges from a first threshold value to a second threshold value, the first threshold value being the amount of the addition amount for realizing the friction coefficient at which transmission efficiency from the worm wheel to the worm gear becomes 0 [%], the second threshold value being the amount of the addition amount for realizing the friction coefficient at which a starting voltage of the motor, the starting voltage being required to move the opening and closing mechanism in a direction of opening, becomes a minimum guaranteed voltage of the battery after the opening and closing mechanism is restrained to be fully closed in a specific environment and, wherein the specific environment is an environment in which an output voltage of the battery is higher than a rated voltage of the battery.

2. The speed reducer-equipped motor unit according to claim 1, wherein the solid additive is an acrylic resin powder.

3. The speed reducer-equipped motor unit according to claim 1, wherein the minimum guaranteed voltage is a voltage that is 60 [%] of a rated voltage of the battery.

4. The speed reducer-equipped motor unit according to claim 1, wherein the opening and closing mechanism is a power window.

* * * * *